(12) United States Patent
Yang et al.

(10) Patent No.: US 12,513,617 B2
(45) Date of Patent: Dec. 30, 2025

(54) SYSTEMS AND METHODS FOR UTILIZING MACHINE LEARNING MODELS TO CONSERVE ENERGY IN NETWORK DEVICES

(71) Applicant: Verizon Patent and Licensing Inc., Basking Ridge, NJ (US)

(72) Inventors: Jin Yang, Orinda, CA (US); Viviana Rivera Torrico, Mission Viejo, CA (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 359 days.

(21) Appl. No.: 17/931,612

(22) Filed: Sep. 13, 2022

(65) Prior Publication Data
US 2024/0089852 A1  Mar. 14, 2024

(51) Int. Cl.
*H04W 52/02* (2009.01)
*H04W 24/08* (2009.01)
*H04W 28/082* (2023.01)

(52) U.S. Cl.
CPC ....... *H04W 52/0206* (2013.01); *H04W 24/08* (2013.01); *H04W 28/082* (2023.05)

(58) Field of Classification Search
CPC ............ H04W 36/0072; H04W 24/02; H04W 36/0083; H04W 52/0203; H04W 52/0206; H04W 24/08; H04W 28/082; G06N 20/00
See application file for complete search history.

(56) References Cited

U.S. PATENT DOCUMENTS

| | | | |
|---|---|---|---|
| 2021/0021494 A1* | 1/2021 | Yao | G06N 5/04 |
| 2022/0408377 A1* | 12/2022 | Kotaru | H04W 52/241 |
| 2024/0298225 A1* | 9/2024 | Hyde | H04W 36/0083 |

\* cited by examiner

*Primary Examiner* — Dady Chery

(57) ABSTRACT

A device may receive network data identifying reference signal data for a radio access network (RAN), control signal data for the RAN, and network key performance indicators (KPIs) associated with the RAN, and may receive energy consumption data identifying energy consumption by the RAN. The device may process the network data and the energy consumption data, with one or more machine learning models, to identify actions that reduce energy consumption at a radio unit (RU), a distributed unit (DU), or a control unit (CU) of the RAN and that control and minimize a control signal and a reference signal at the RAN. The device may cause the actions to be implemented by the RU, the DU, the CU, or the RAN to save energy at the RAN.

20 Claims, 11 Drawing Sheets

SYSTEMS AND METHODS FOR UTILIZING MACHINE LEARNING MODELS TO CONSERVE ENERGY IN NETWORK DEVICES

BACKGROUND

Energy costs for telecommunications networks are already high, and look set to rise further, putting greater pressure on costs at a time when the telecommunications industry can scarcely handle any additional financial burden.

DETAILED DESCRIPTION OF EXAMPLE EMBODIMENTS

The following detailed description of example implementations refers to the accompanying drawings. The same reference numbers in different drawings may identify the same or similar elements.

The growing energy challenge is a result of the exponential growth in traffic that new fifth-generation (5G) services are delivering. Although the 5G New Radio (NR) standard is more energy efficient per gigabyte than are fourth-generation (4G) standards, the 5G new spectrum bands require many more mobile sites. Furthermore, there is increasing pressure to provide environmentally friendly (e.g., green) telecommunications services in the telecommunications networks and in user equipment (UEs).

Some implementations described herein provide a monitoring system that utilizes machine learning models to conserve energy in network devices. For example, the monitoring system may receive network data identifying reference signal data for a radio access network (RAN), control signal data for the RAN, and network key performance indicators (KPIs) associated with the RAN, and may receive energy consumption data identifying energy consumption by the RAN. The monitoring system may process the network data and the energy consumption data, with one or more machine learning models, to identify actions that reduce energy consumption. For example, the actions may reduce energy consumption at a radio unit (RU), a distributed unit (DU), or a control unit (CU) of the RAN and may control and minimize a control signal and a reference signal at the RAN. The device may cause the actions to be implemented by the RU, the DU, the CU, or the RAN to save energy at the RAN.

In this way, the monitoring system utilizes machine learning models to conserve energy in network devices. For example, the monitoring system may utilize one or more machine learning models to identify spatial domain energy savings for network devices of a network. The monitoring system may determine traffic allocations for the network devices, in real time, to reduce the energy consumption at the network devices according to a minimal energy consumption by the network devices. The monitoring system may control and minimize control signal and reference signal utilization by the network devices to further reduce energy consumption by the network devices. Thus, the monitoring system may conserve computing resources, networking resources, and/or other resources that would otherwise have been consumed in inefficiently using network devices of a network, failing to manage energy consumption by the network devices, failing to manage energy consumption by UEs of the network, failing to provide standards that will ensure that the network is environmentally friendly, and/or the like.

Figure 1A:
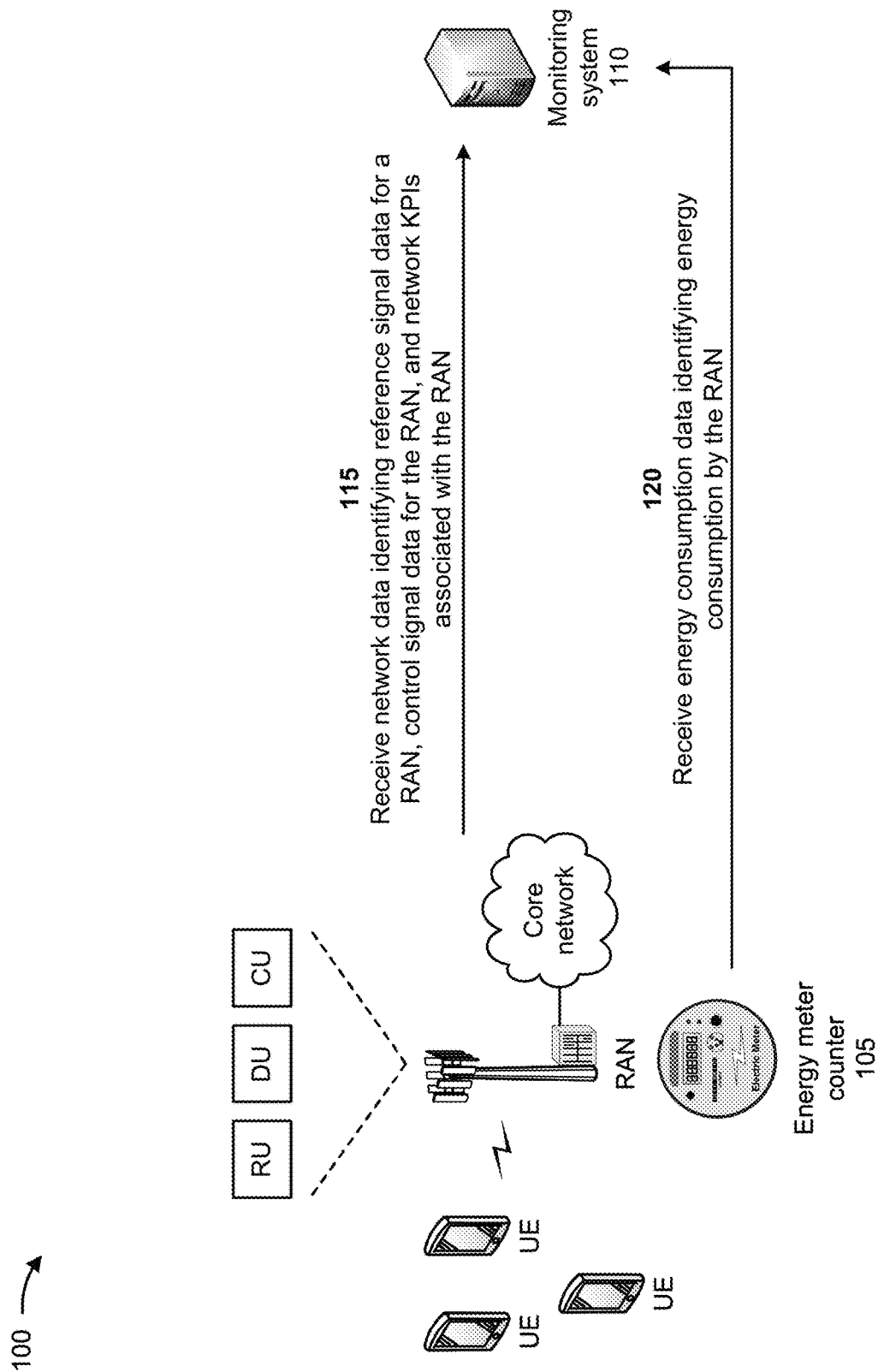
FIGS. 1A-1G are diagrams of an example associated with utilizing machine learning models to conserve energy in network devices.

FIGS. 1A-1G are diagrams of an example 100 associated with identifying and correcting issues associated with a wireless network. As shown in FIGS. 1A-1G, example 100 includes a plurality of UEs, a radio access network (RAN) (e.g., with a radio unit (RU), a distributed unit (DU), and a central unit (CU), a core network, an energy meter counter 105, and a monitoring system 110. Further details of the plurality of UEs, the RAN, the core network, the energy meter counter 105, and the monitoring system 110 are provided elsewhere herein. Although only a single energy meter counter 105 is shown in FIG. 1A, in some implementations, multiple energy meter counters 105 may be associated with the RAN, the RU, the DU, the CU, and/or network devices of the core network.

In some aspects, the term "RAN" may refer to an aggregated base station, a disaggregated base station, an integrated access and backhaul (IAB) node, a relay node, and/or one or more components thereof. For example, in some aspects, "RAN" may refer to a CU, a DU, an RU, a Near-Real Time (Near-RT) RAN Intelligent Controller (RIC), or a Non-Real Time (Non-RT) RIC, or a combination thereof. In some aspects, the term "RAN" may refer to one device configured to perform one or more functions, such as those described herein in connection with the RAN. In some aspects, the term "RAN" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "RAN" may refer to any one or more of those different devices. In some aspects, the term "RAN" may refer to one or more virtual base stations and/or one or more virtual base station functions. For example, in some aspects, two or more base station functions may be instantiated on a single device. In some aspects, the term "RAN" may refer to one of the base station functions and not another. In this way, a single device may include more than one base station.

As shown in FIG. 1A, and by reference number 115, the monitoring system 110 may receive network data identifying reference signal data for the RAN, control signal data for the RAN, and network key performance indicators (KPIs) associated with the RAN. For example, the RAN may generate the reference signal data identifying reference signals (e.g., reference signal levels, such as high, low, or medium) communicated between the RAN and the UEs, may generate the control signal data identifying the control signals (e.g., control signal levels, such as high, low, or medium) communicated between the RAN and the UEs, and/or the like. The RAN and/or the core network may generate the network KPIs, such as RAN accessibility KPIs, RAN retainability KPIs, RAN integrity KPIs, RAN availability KPIs, RAN mobility KPIs, RAN user throughput KPIs, RAN latency KPIs, RAN reliability KPIs, and/or the like. The network data may also include data identifying frequency domain resource allocation by the RAN (e.g., to coordinate among DUs), traffic load at the RAN, UE location distribution for the RAN, mobility associated with the RAN, and/or the like. The monitoring system 110 may receive the network data from the RAN, the RU, the DU, the CU, and/or the core network.

In some implementations, the monitoring system 110 may continuously receive the network data from the RAN, the RU, the DU, the CU, and/or the core network, may periodically receive the network data from the RAN, the RU, the DU, the CU, and/or the core network, may receive the network data from the RAN, the RU, the DU, the CU, and/or the core network based on requesting the network data, and/or the like.

As further shown in FIG. 1A, and by reference number 120, the monitoring system 110 may receive energy consumption data identifying energy consumption by the RAN. For example, an energy meter counter 105 may be associated with the RAN, the RU, the DU, the CU, and/or network devices of the core network, and may monitor the energy consumption by the RAN, the RU, the DU, the CU, and/or the network devices. The energy meter counter 105 may measure a quantity of electric energy (e.g., kilowatt hours) consumed by an electrically powered device (e.g., the RAN, the RU, the DU, the CU, and/or the network devices) over a time interval. The monitoring system 110 may continuously receive the energy consumption data from the energy meter counter 105, may periodically receive the energy consumption data from the energy meter counter 105, may receive the energy consumption data from the energy meter counter 105 based on requesting the energy consumption data, and/or the like.

Figure 1B:
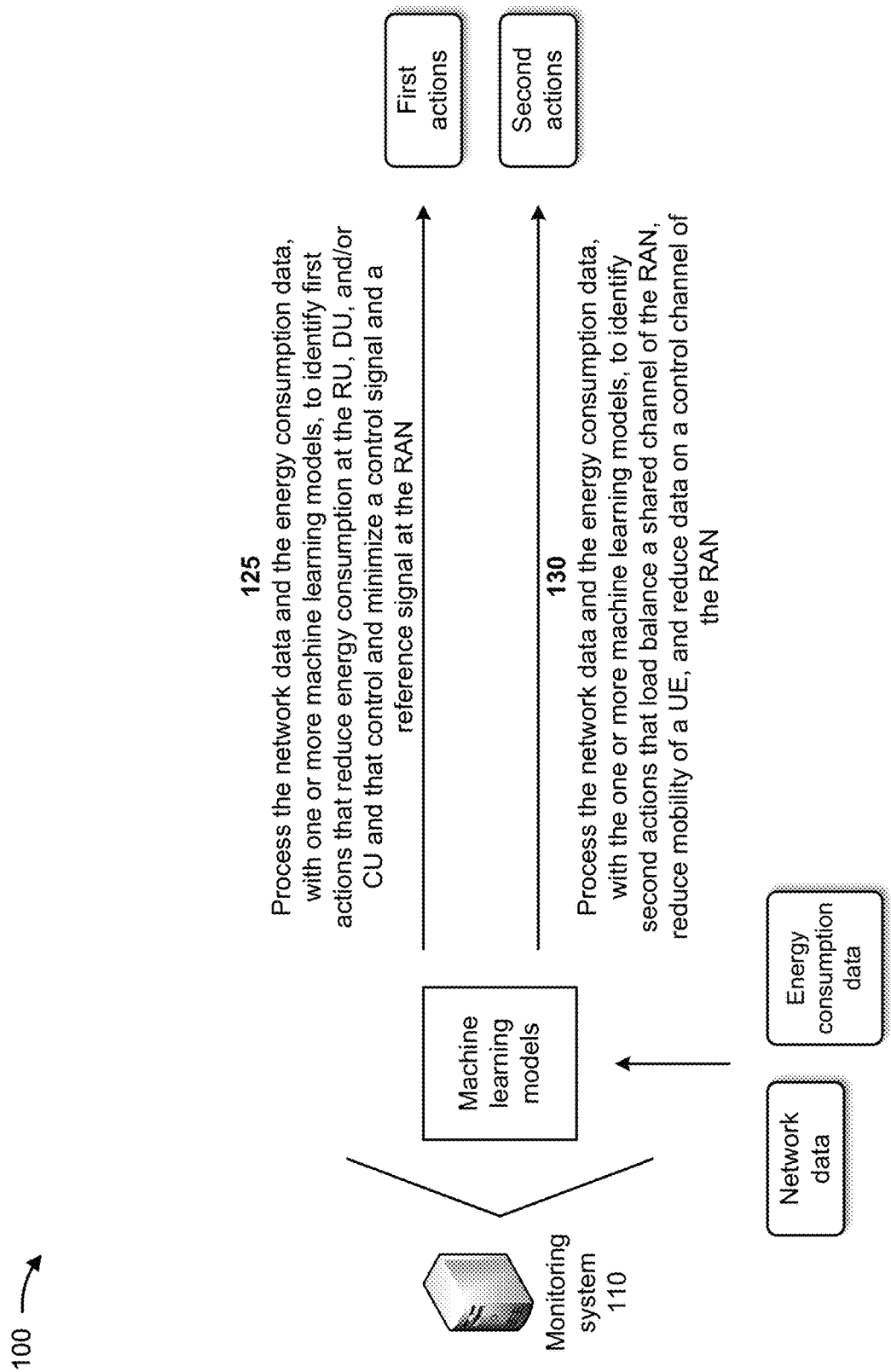

As shown in FIG. 1B, and by reference number 125, the monitoring system 110 may process the network data and the energy consumption data, with one or more machine learning models, to identify first actions that reduce energy consumption at the RU, the DU, and/or the CU and that control and minimize a control signal and a reference signal at the RAN. For example, the monitoring system 110 may utilize the one or more machine learning models to identify the first actions based on the network data and the energy consumption data. The first actions may include actions that reduce the energy consumption at the RU, the DU, and/or the CU by controlling loads at the RU, the DU, and/or the CU, controlling power on and off at the RU, the DU, and/or the CU, controlling reference signal levels at the RU, the DU, and/or the CU, controlling control signal levels at the RU, the DU, and/or the CU, controlling frequency domain resource allocation at the RU, the DU, and/or the CU, controlling time domain resource allocation at the RU, the DU, and/or the CU, and/or the like. The first actions may include actions that reduce the energy consumption at the RAN by controlling loads at the RAN, controlling power on and off at the RAN, controlling reference signal levels at the RAN, controlling control signal levels at the RAN, controlling frequency domain resource allocation at the RAN, controlling time domain resource allocation at the RAN, and/or the like.

As further shown in FIG. 1B, and by reference number 130, the monitoring system 110 may process the network data and the energy consumption data, with the one or more machine learning models, to identify second actions that load balance a shared channel of the RAN, reduce mobility of a UE, and reduce data on a control channel of the RAN. For example, the monitoring system 110 may utilize the one or more machine learning models to identify the second actions based on the network data and the energy consumption data. The second actions may include actions that reduce energy consumption at the RAN by load balancing traffic provided on a shared channel of the RAN while maintaining the network KPIs. The second actions may include actions that reduce energy consumption at the RAN and the UE by preventing the UE from moving between different frequency bands of the RAN when the UE is located on a border of different frequency bands of the RAN, by preventing the UE from moving to a different RAN when the UE is located on a border of the RAN and the different RAN, and/or the like. The second actions may include actions that reduce energy consumption at the RAN by reducing data traffic provided on the control channel of the RAN.

Figure 1C:
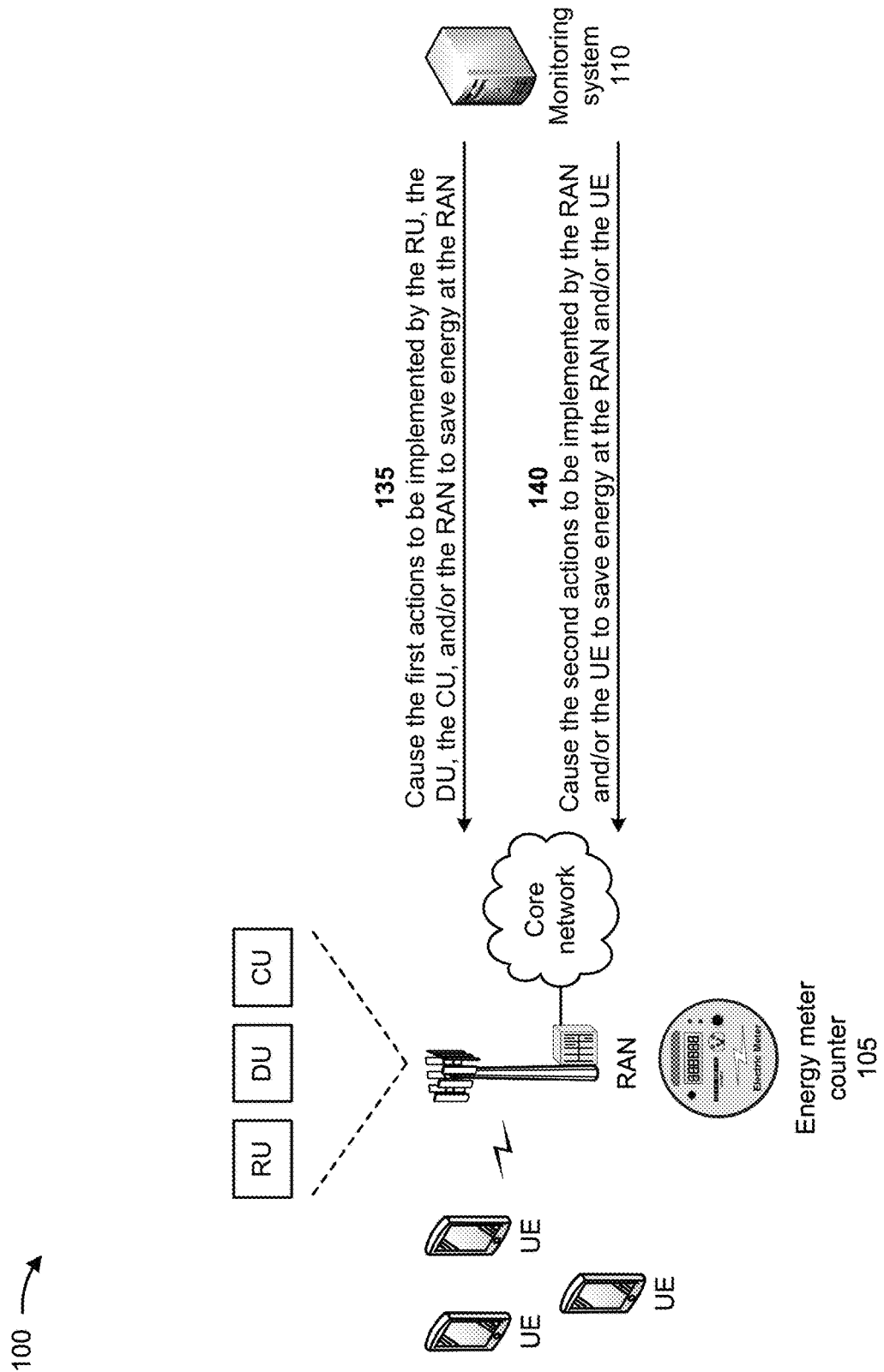

As shown in FIG. 1C, and by reference number 135, the monitoring system 110 may cause the first actions to be implemented by the RU, the DU, the CU, and/or the RAN to save energy at the RAN. For example, the monitoring system 110 may cause the RU, the DU, and/or the CU to control the loads at the RU, the DU, and/or the CU, control the power on and off at the RU, the DU, and/or the CU, control the reference signal levels at the RU, the DU, and/or the CU, control the control signal levels at the RU, the DU, and/or the CU, control the frequency domain resource allocation at the RU, the DU, and/or the CU, control the time domain resource allocation at the RU, the DU, and/or the CU, and/or the like. The monitoring system 110 may cause the RAN to control the loads at the RAN, control the power on and off at the RAN, control the reference signal levels at the RAN, control the control signal levels at the RAN, control the frequency domain resource allocation at the RAN, control the time domain resource allocation at the RAN, and/or the like.

As further shown in FIG. 1C, and by reference number 140, the monitoring system 110 may cause the second actions to be implemented by the RAN and/or the UE to save energy at the RAN and/or the UE. For example, the monitoring system 110 may cause the RAN to load balance traffic provided on the shared channel of the RAN while maintaining the network KPIs. The monitoring system 110 may cause the RAN to prevent the UE from moving between different frequency bands of the RAN when the UE is located on a border of different frequency bands of the RAN, may cause the RAN to prevent the UE from moving to a different RAN when the UE is located on a border of the RAN and the different RAN, and/or the like. The monitoring system 110 may cause the RAN to reduce data traffic provided on the control channel of the RAN.

Figure 1D:
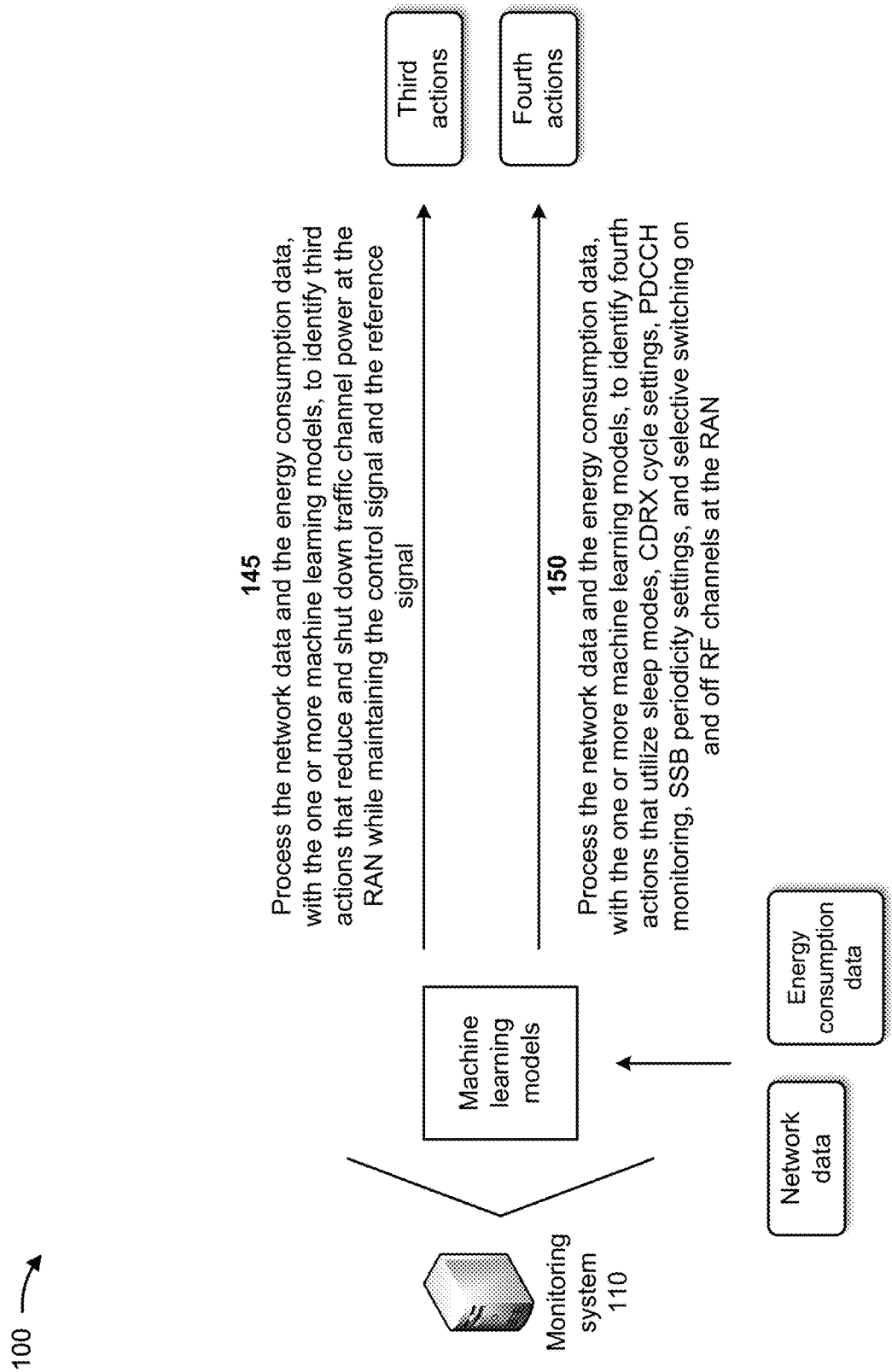

As shown in FIG. 1D, and by reference number 145, the monitoring system 110 may process the network data and the energy consumption data, with the one or more machine learning models, to identify third actions that reduce and shut down traffic channel power at the RAN while maintaining the control signal and the reference signal. For example, the monitoring system 110 may utilize the one or more machine learning models to identify the third actions based on the network data and the energy consumption data. The third actions may include actions that reduce energy consumption at the RAN by reducing and/or shutting down power for the traffic channel at the RAN while maintaining the control signal and the reference signal at the RAN.

As further shown in FIG. 1D, and by reference number 150, the monitoring system 110 may process the network data and the energy consumption data, with the one or more machine learning models, to identify fourth actions that utilize sleep modes, connected mode discontinuous reception (CDRX) cycle settings, physical downlink control channel (PDCCH) monitoring, synchronization signal block (SSB) periodicity settings, and selective switching on and off radio frequency (RF) channels at the RAN. For example, the monitoring system 110 may utilize the one or more machine learning models to identify the fourth actions based on the network data and the energy consumption data. The fourth actions may include actions that reduce energy consumption at the RAN and the UE by utilizing the sleep modes, the CDRX cycle settings, and the PDCCH monitoring at the RAN. The fourth actions may include actions that reduce energy consumption at the RAN by utilizing the SSB periodicity settings at the RAN. The fourth actions may include actions that reduce energy consumption at the RAN by selectively switching on and off the RF channels at the RAN.

Figure 1E:
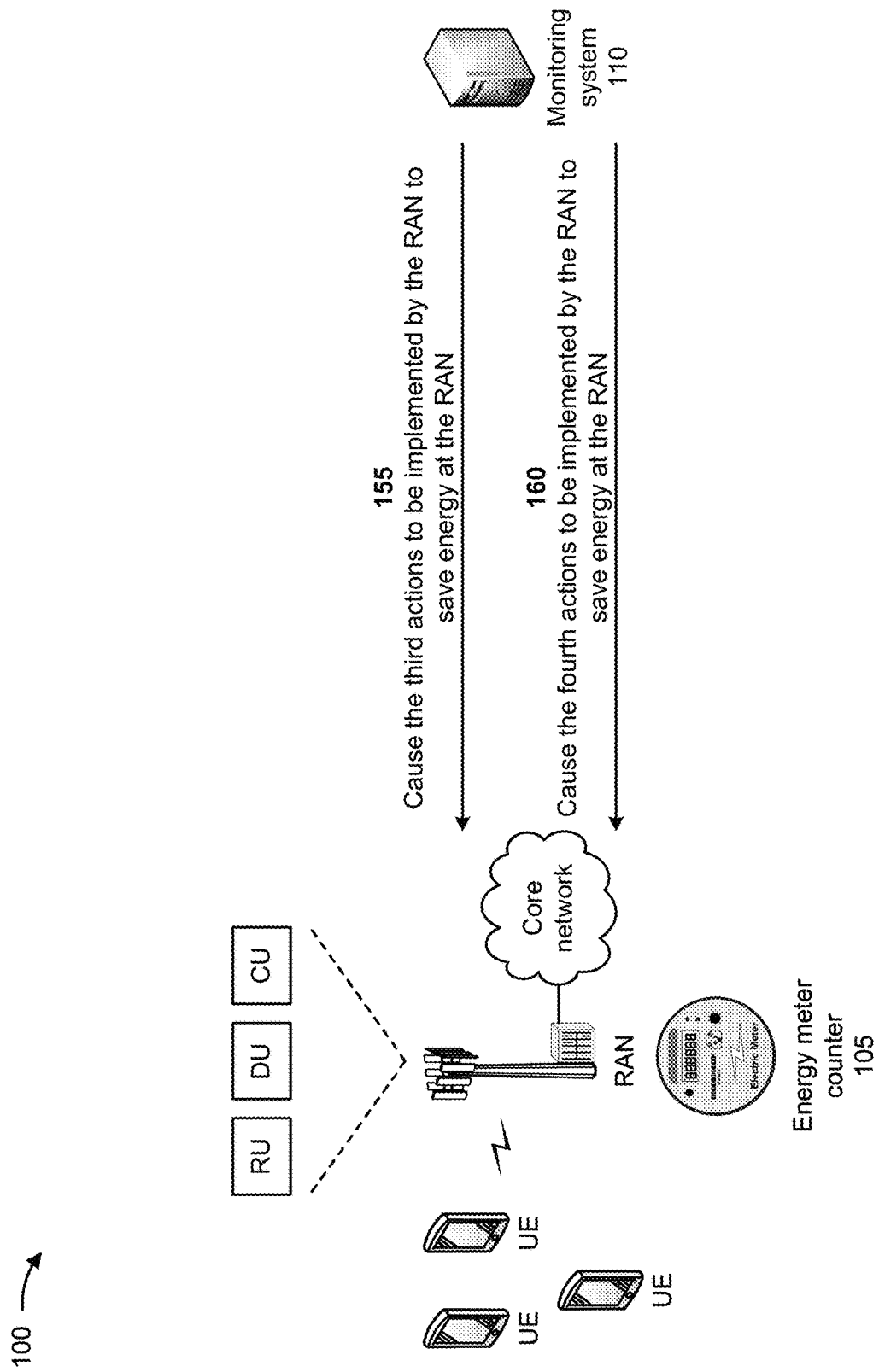

As shown in FIG. 1E, and by reference number 155, the monitoring system 110 may cause the third actions to be implemented by the RAN to save energy at the RAN. For example, the monitoring system 110 may cause the RAN to reduce and/or shut down power for the traffic channel at the RAN while maintaining the control signal and the reference signal at the RAN.

As further shown in FIG. 1E, and by reference number 160, the monitoring system 110 may cause the fourth actions to be implemented by the RAN to save energy at the RAN. For example, the monitoring system 110 may cause the RAN and/or the UE to utilize the sleep modes, the CDRX cycle settings, and the PDCCH monitoring at the RAN. The monitoring system 110 may cause the RAN to utilize the SSB periodicity settings at the RAN. The monitoring system 110 may cause the RAN to selectively switch on and off the RF channels at the RAN.

Figure 1F:
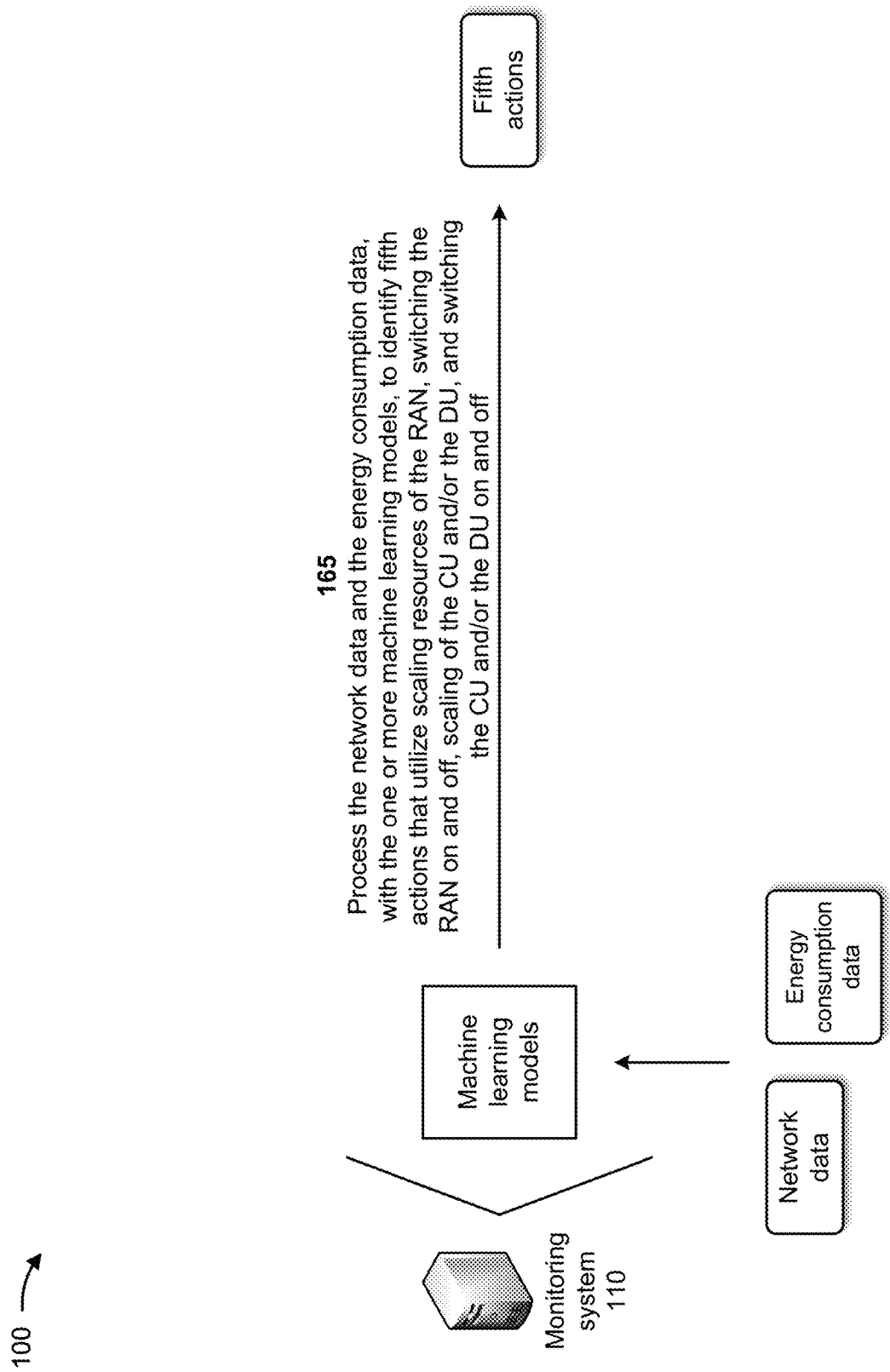

As shown in FIG. 1F, and by reference number 165, the monitoring system 110 may process the network data and the energy consumption data, with the one or more machine learning models, to identify fifth actions that utilize scaling resources of the RAN, switching the RAN on and off, scaling resources of the CU and/or the DU, and switching the CU and/or the DU on and off. For example, the monitoring system 110 may utilize the one or more machine learning models to identify the fifth actions based on the network data and the energy consumption data. The fifth actions may include actions that reduce energy consumption at the RAN by scaling the resources of the RAN. The fifth actions may include actions that reduce energy consumption at the RAN by switching the RAN on and off. The fifth actions may include actions that reduce energy consumption at the CU and/or the DU by scaling the resources of the CU and/or the DU. The fifth actions may include actions that reduce energy consumption at the CU and/or the DU by switching the CU and/or the DU on and off.

Figure 1G:
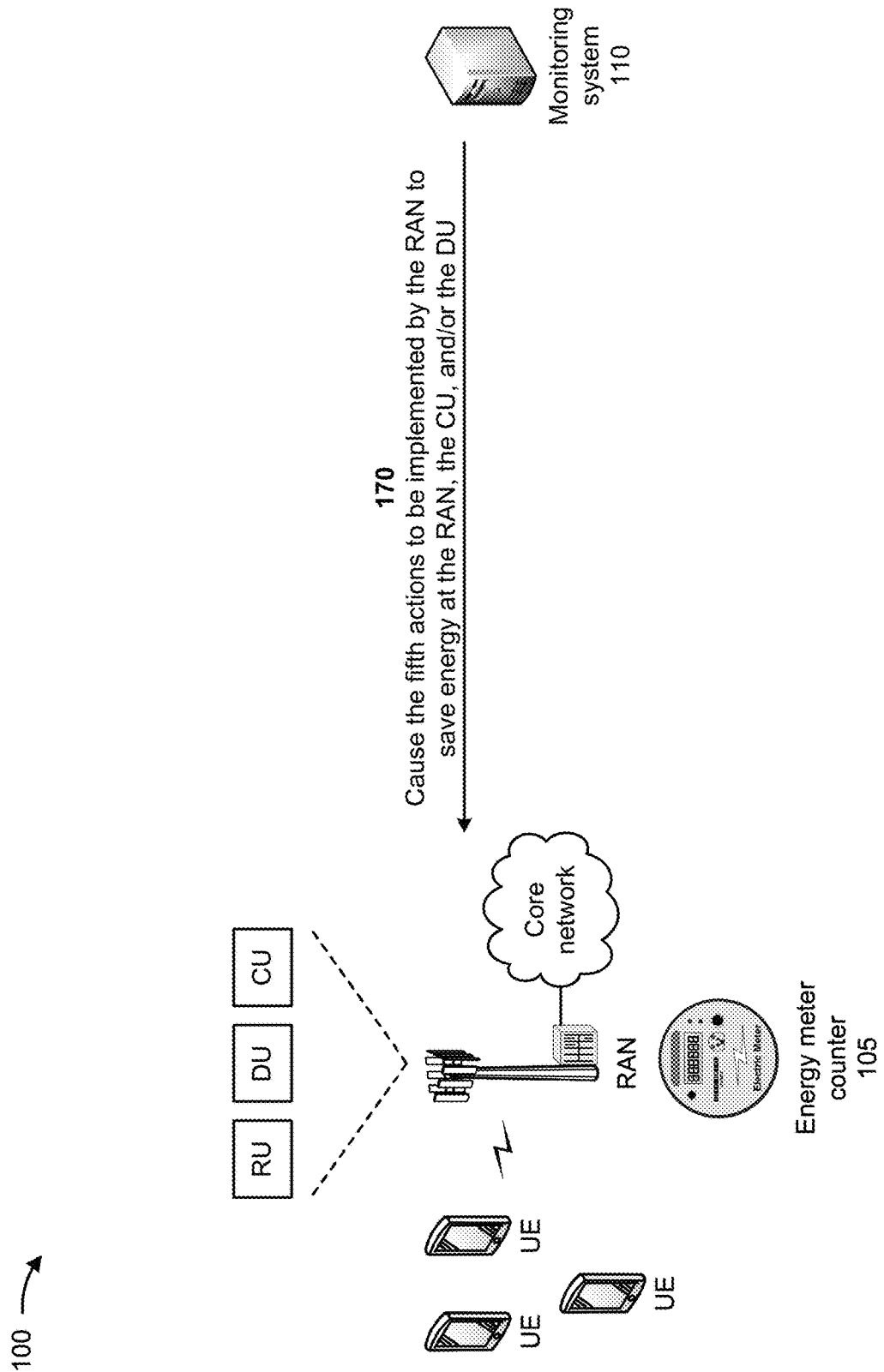

As shown in FIG. 1G, and by reference number 170, the monitoring system 110 may cause the fifth actions to be implemented by the RAN to save energy at the RAN, the CU, and/or the DU. For example, the monitoring system 110 may cause the RAN to scale the resources of the RAN. The monitoring system 110 may cause the RAN to switch the RAN on and off. The monitoring system 110 may cause the CU and/or the DU to scale the resources of the CU and/or the DU. The monitoring system 110 may cause the CU and/or the DU to switch the CU and/or the DU on and off.

In some implementations, the monitoring system 110 may train the one or more machine learning models with historical traffic load data for the RAN, historical UE location distribution data for the RAN, historical UE mobility data for the RAN, and historical energy consumption by the RAN. As described elsewhere herein, the one or more machine learning models may be trained to process the network data and the energy consumption data and to identify actions that reduce energy consumption. In some implementations, rather than training the one or more machine learning models, the monitoring system 110 may obtain one or more trained machine learning models from another system or device that trained the one or more machine learning models. In this case, the monitoring system 110 may provide the other system or device with the historical traffic load data for the RAN, the historical UE location distribution data for the RAN, the historical UE mobility data for the RAN, and the historical energy consumption by the RAN for use in training the one or more machine learning models, and may provide the other system or device with updated training data to retrain the one or more machine learning models in order to update the one or more machine learning models. In some implementations, the monitoring system 110 may retrain the one or more machine learning models based on the actions identified by the one or more machine learning models.

In some implementations, each of the one or more machine learning models may include a clustering model. A clustering model may use cluster analysis (also known as clustering) to perform machine learning. Cluster analysis is the task of grouping a set of objects in such a way that objects in the same group (called a cluster) are more similar (in some sense) to each other than to objects in other groups (clusters). Cluster analysis can be achieved by various algorithms that differ significantly in their notion of what constitutes a cluster and how to efficiently find them. Popular notions of clusters include groups with small distances between cluster members, dense areas of the data space, intervals or particular statistical distributions, and/or the like. Different cluster models (with correspondingly different cluster algorithms) may include connectivity models (e.g., where hierarchical clustering builds models based on distance connectivity), centroid models (e.g., where the k-means algorithm represents each cluster by a single mean vector), distribution models (e.g., where clusters are modeled using statistical distributions, such as multivariate normal distributions used by the expectation-maximization algorithm), density models (e.g., where clusters are defined as connected dense regions in the data space), and/or the like. Further details of the one or more machine learning models are provided below in connection with FIG. 2.

In this way, the monitoring system 110 utilizes machine learning models to conserve energy in network devices. For example, the monitoring system 110 may utilize one or more machine learning models to identify spatial domain energy savings for network devices of a network 320. The monitoring system 110 may determine traffic allocations for the network devices, in real time, to reduce the energy consumption at the network devices according to a minimal energy consumption by the network devices. The monitoring system 110 may control and minimize control signal and reference signal utilization by the network devices to further reduce energy consumption by the network devices. Thus, the monitoring system 110 may conserve computing resources, networking resources, and/or other resources that would otherwise have been consumed in inefficiently using network devices of a network 320, failing to manage energy consumption by the network devices, failing to manage energy consumption by UEs 330 of the network 320, failing to provide standards that will ensure that the network 320 is environmentally friendly, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
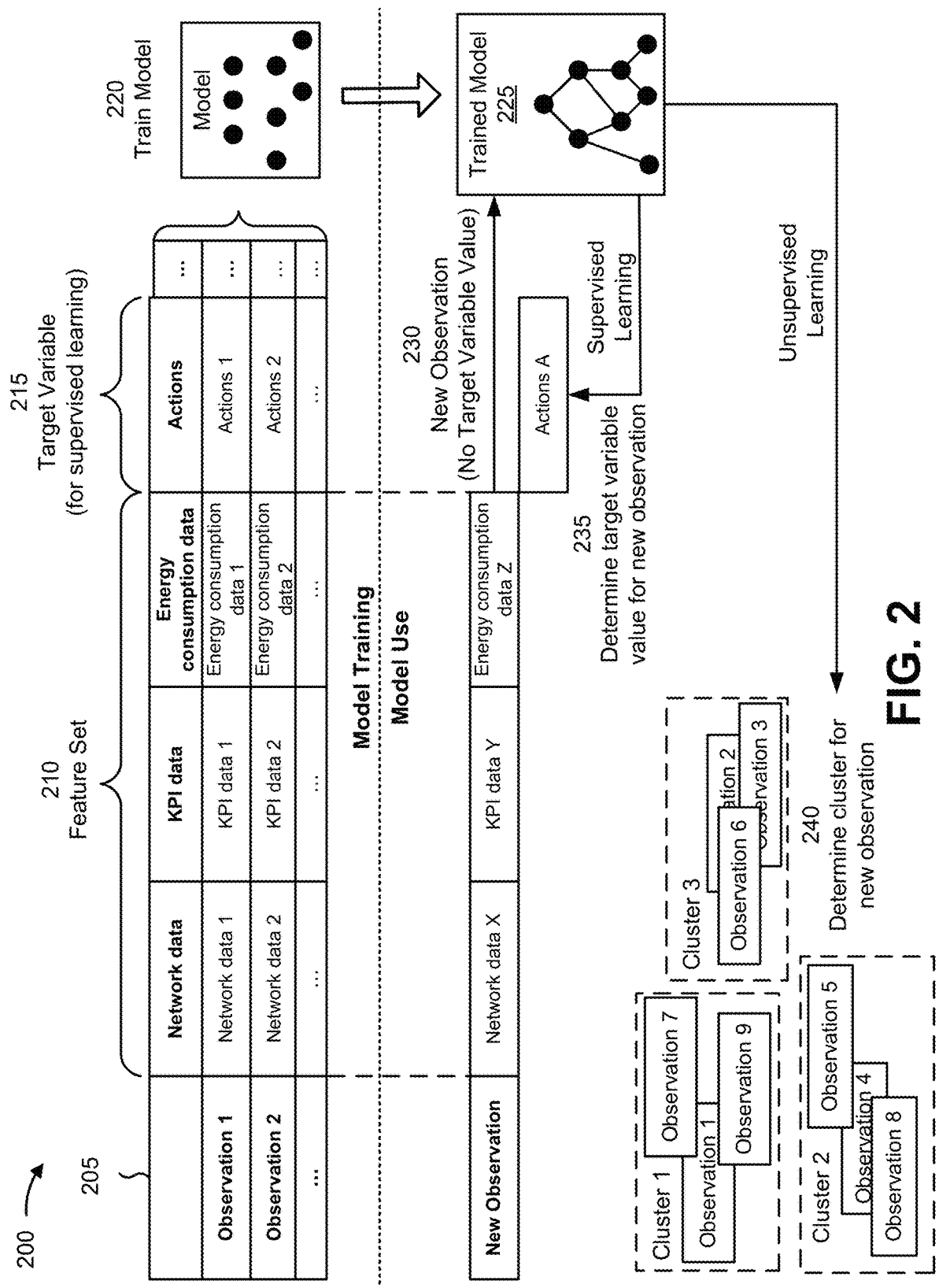
FIG. 2 is a diagram illustrating an example of training and using a machine learning model.

FIG. 2 is a diagram illustrating an example 200 of training and using a machine learning model for conserving energy in network devices. The machine learning model training and usage described herein may be performed using a machine learning system. The machine learning system may include or may be included in a computing device, a server, a cloud computing environment, and/or the like, such as the monitoring system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the monitoring system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the monitoring system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of network data, a second feature of KPI data, a third feature of energy consumption data, and so on. As shown, for a first observation, the first feature may have a value of network data 1, the second feature may have a value of KPI data 1, the third feature may have a value of energy consumption data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labelled actions and may include a value of actions 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of network data X, a second feature of KPI data Y, a third feature of energy consumption data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of actions A for the target variable of the component for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a network data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a KPI data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to conserve energy in network devices. The machine learning system enables recognition and/or identification of tens, hundreds, thousands, or millions of features and/or feature values for tens, hundreds, thousands, or millions of observations, thereby increasing accuracy and consistency and reducing delay associated with conserving energy in network devices relative to requiring computing resources to be allocated for tens, hundreds, or thousands of operators to manually conserve energy in network devices.

As indicated above, FIG. 2 is provided as an example. Other examples may differ from what is described in connection with FIG. 2.

Figure 3:
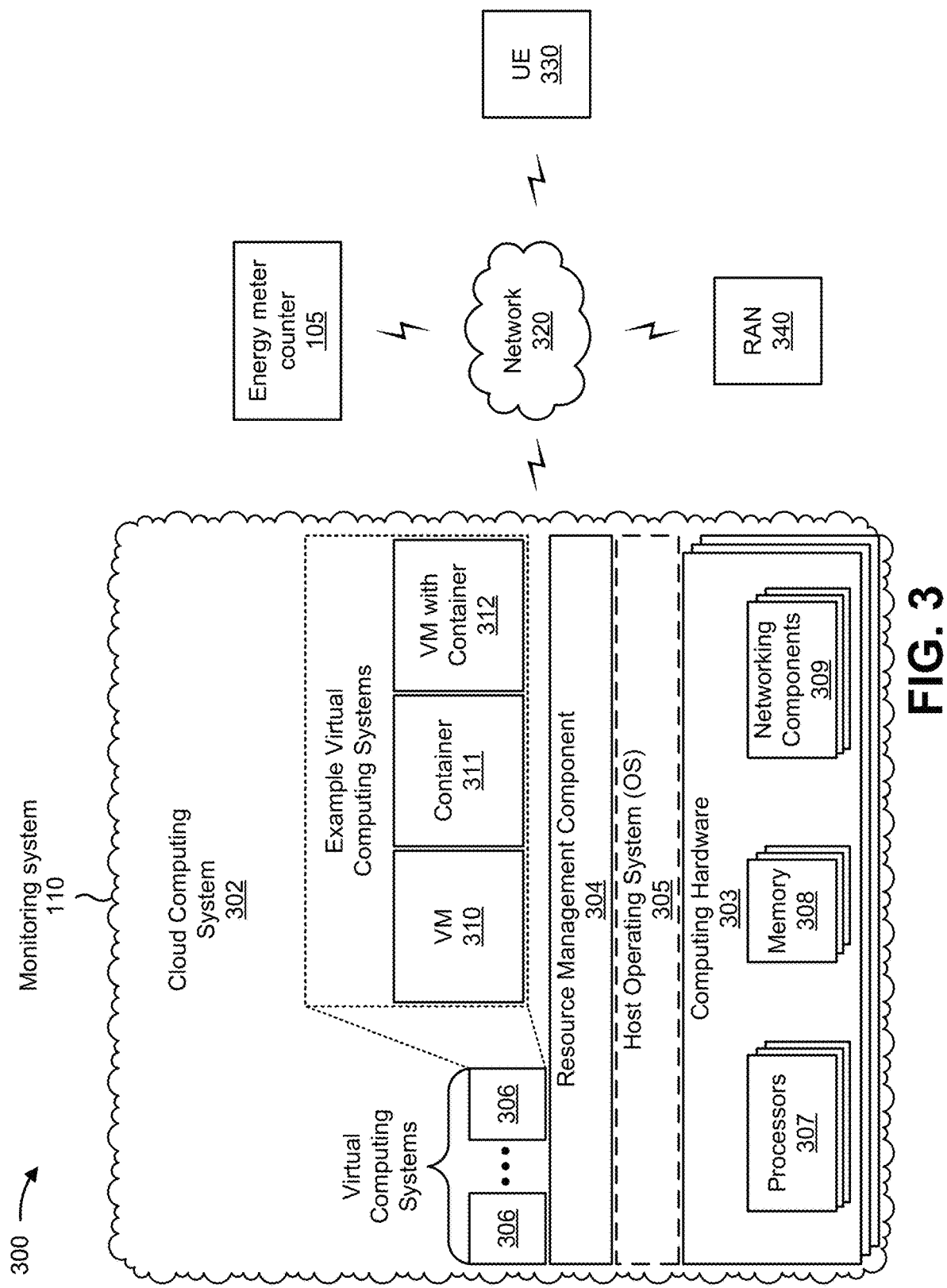
FIG. 3 is a diagram of an example environments in which systems and/or methods described herein may be implemented.

FIG. 3 is a diagram of an example environment 300 in which systems and/or methods described herein may be implemented. As shown in FIG. 3, the environment 300 may include the monitoring system 110, which may include one or more elements of and/or may execute within a cloud computing system 302. The cloud computing system 302 may include one or more elements 303-312, as described in more detail below. As further shown in FIG. 3, the environment 300 may include the energy meter counter 105, a network 320, a UE 330, and/or a RAN 340. Devices and/or elements of the environment 300 may interconnect via wired connections and/or wireless connections.

The energy meter counter 105 may include one or more devices capable of receiving, generating, storing, processing, and/or providing information, as described elsewhere herein. The energy meter counter 105 may include a communication device and/or a computing device. For example, the energy meter counter 105 may include a wireless communication device, a device that measures a quantity of electric energy (e.g., kilowatt hours) consumed by an electrically powered device (e.g., a network device, such as the UE 330, the RAN 340, the RU, the DU, the CU, and/or the like) over a time interval, or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 includes a virtual environment that enables cloud-based execution of operations and/or processes described herein using the computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the monitoring system 110 may include one or more elements 303-312 of the cloud computing system 302, may execute within the cloud computing system 302, and/or may be hosted within the cloud computing system 302, in some implementations, the monitoring system 110 may not be cloud-based (e.g., may be implemented outside of a cloud computing system) or may be partially cloud-based. For example, the monitoring system 110 may include one or more devices that are not part of the cloud computing system 302, such as a device 400 of FIG. 4, which may include a standalone server or another type of computing device. The monitoring system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The UE 330 includes one or more devices capable of receiving, generating, storing, processing, and/or providing information, such as information described herein. For example, the UE 330 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 340 may support, for example, a cellular radio access technology (RAT). The RAN 340 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 330. The RAN 340 may transfer traffic between the UE 330 (e.g., using a cellular RAT), one or more base stations (e.g., using a wireless interface or a backhaul interface, such as a wired backhaul interface), and/or a core network. The RAN 340 may provide one or more cells that cover geographic areas.

In some implementations, the RAN 340 may perform scheduling and/or resource management for the UE 330 covered by the RAN 340 (e.g., the UE 330 covered by a cell provided by the RAN 340). In some implementations, the RAN 340 may be controlled or coordinated by a network controller, which may perform load balancing, network-level configuration, and/or other operations. The network controller may communicate with the RAN 340 via a wireless or wireline backhaul. In some implementations, the RAN 340 may include a network controller, a self-organizing network (SON) module or component, or a similar module or component. In other words, the RAN 340 may perform network control, scheduling, and/or network management functions (e.g., for uplink, downlink, and/or sidelink communications of the UE 330 covered by the RAN 340).

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
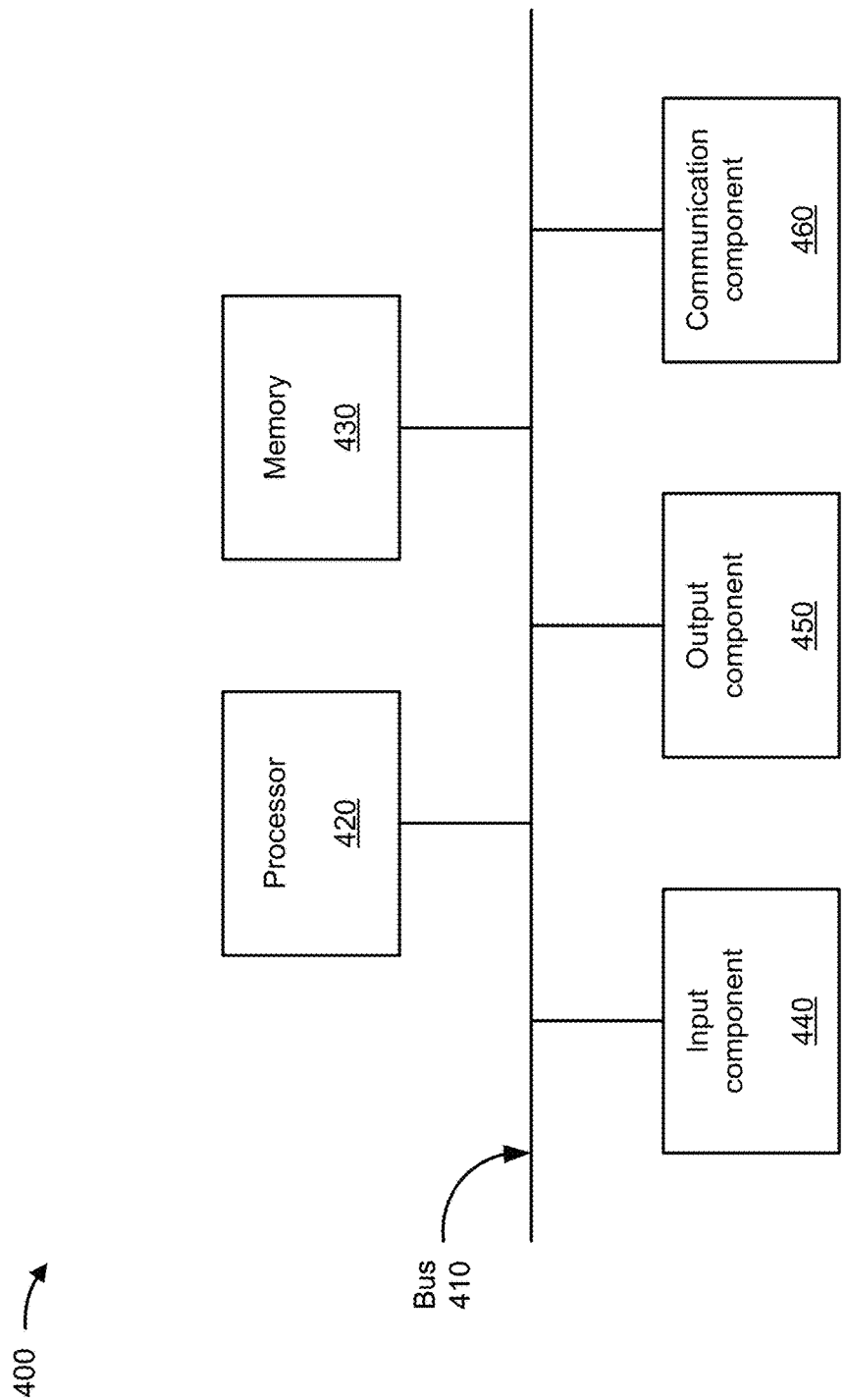
FIG. 4 is a diagram of example components of one or more devices of FIG. 3.

FIG. 4 is a diagram of example components of a device 400, which may correspond to the energy meter counter 105, the monitoring system 110, the UE 330, and/or the RAN 340. In some implementations, the energy meter counter 105, the monitoring system 110, the UE 330, and/or the RAN 340 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. Memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
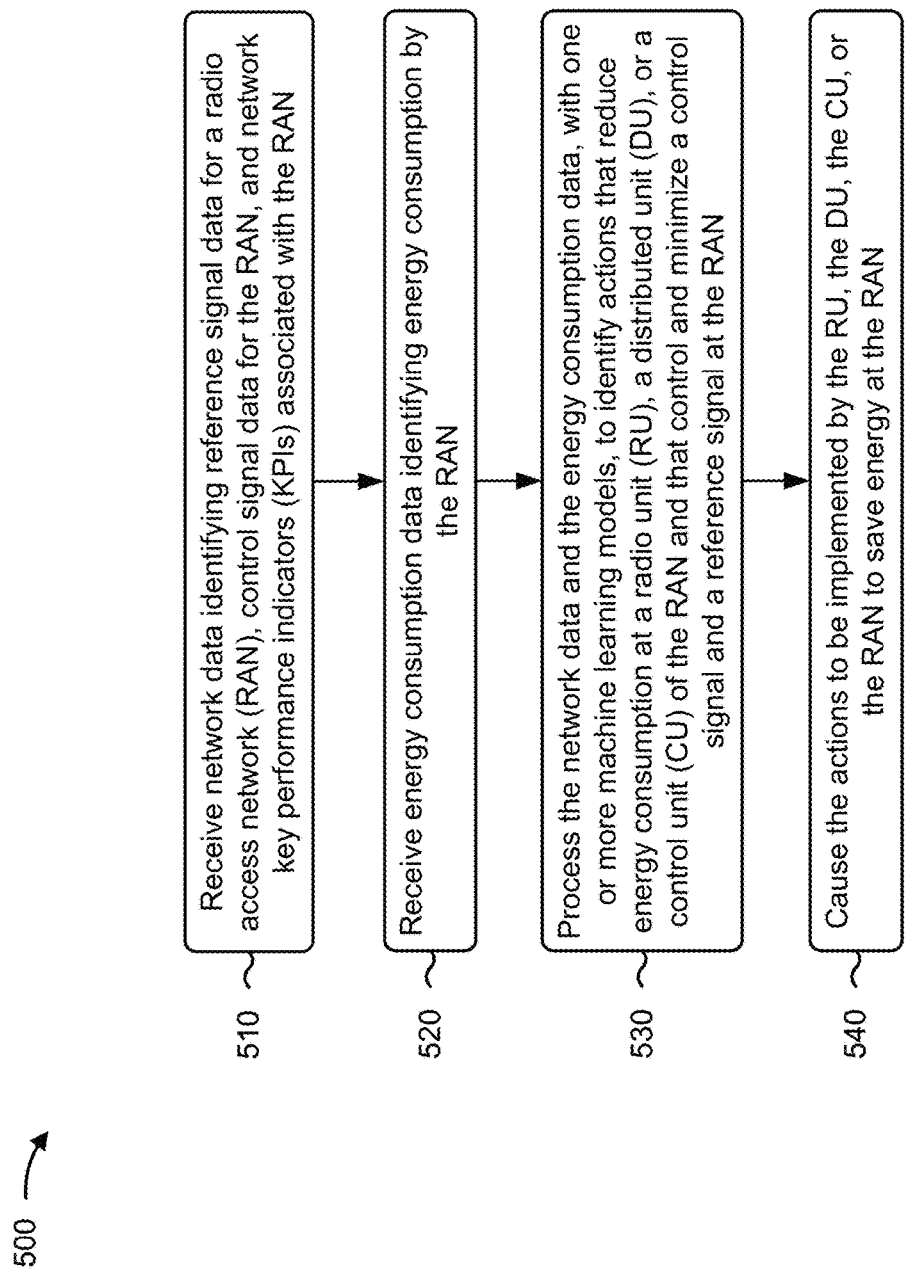
FIG. 5 is a flowchart of an example process for utilizing machine learning models to conserve energy in network devices.

FIG. 5 is a flowchart of an example process 500 for utilizing machine learning models to conserve energy in network devices. In some implementations, one or more process blocks of FIG. 5 may be performed by a device (e.g., the monitoring system 110). In some implementations, one or more process blocks of FIG. 5 may be performed by another device or a group of devices separate from or including the device, such as a UE (e.g., the UE 330). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving network data identifying reference signal data for a RAN, control signal data for the RAN, and network KPIs associated with the RAN (block 510). For example, the device may receive network data identifying reference signal data for a RAN, control signal data for the RAN, and network KPIs associated with the RAN, as described above. In some implementations, the reference signal data includes data identifying levels of reference signals associated with the RAN, and the control signal data includes data identifying levels of control signals associated with the RAN. In some implementations, the network data further identifies a frequency domain resource allocation associated with the RAN. In some implementations, the network KPIs provide a measure of one or more of throughput at the RAN, latency at the RAN, or reliability of the RAN.

As further shown in FIG. 5, process 500 may include receiving energy consumption data identifying energy consumption by the RAN (block 520). For example, the device may receive energy consumption data identifying energy consumption by the RAN, as described above. In some implementations, the energy consumption data is received from one or more energy meter counters associated with the RAN.

As further shown in FIG. 5, process 500 may include processing the network data and the energy consumption data, with one or more machine learning models, to identify actions that reduce energy consumption at an RU, a DU, or a CU of the RAN and that control and minimize a control signal and a reference signal at the RAN (block 530). For example, the device may process the network data and the energy consumption data, with one or more machine learning models, to identify actions that reduce energy consumption at an RU, a DU, or a CU of the RAN and that control and minimize a control signal and a reference signal at the RAN, as described above. In some implementations, the actions maintain the network KPIs while controlling and minimizing the control signal and the reference signal at the RAN.

As further shown in FIG. 5, process 500 may include causing the actions to be implemented by the RU, the DU, the CU, or the RAN to save energy at the RAN (block 540). For example, the device may cause the actions to be implemented by the RU, the DU, the CU, or the RAN to save energy at the RAN, as described above.

In some implementations, process 500 includes processing the network data and the energy consumption data, with the one or more machine learning models, to identify additional actions that load balance a shared channel of the RAN, reduce mobility of a UE, and reduce data on a control channel of the RAN; and causing the additional actions to be implemented by the RAN or the UE to save energy at the RAN or the UE. In some implementations, the additional actions prevent the UE from moving from the RAN to another RAN geographically located adjacent to the RAN.

In some implementations, process 500 includes processing the network data and the energy consumption data, with the one or more machine learning models, to identify additional actions that reduce and shut down traffic channel power at the RAN while maintaining a control signal and a reference signal at the RAN, and causing the additional actions to be implemented by the RAN to save energy at the RAN.

In some implementations, process 500 includes processing the network data and the energy consumption data, with the one or more machine learning models, to identify additional actions that utilize sleep modes, CDRX cycle settings, PDCCH monitoring, SSB periodicity settings, or selective switching on and off RF channels at the RAN, and causing the additional actions to be implemented by the RAN to save energy at the RAN.

In some implementations, process 500 includes processing the network data and the energy consumption data, with the one or more machine learning models, to identify additional actions that utilize scaling resources of the RAN, switching the RAN on and off, scaling resources of a CU or a DU of the RAN, and switching the CU or the DU on and off; and causing the additional actions to be implemented by the RAN to save energy at the RAN, the CU, or the DU.

In some implementations, process 500 includes training the one or more machine learning models with historical traffic load data for the RAN, historical user equipment (UE) location distribution data for the RAN, historical UE mobility data for the RAN, and historical energy consumption by the RAN. In some implementations, process 500 includes retraining the one or more machine learning models based on the actions identified by the one or more machine learning models.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, network data identifying reference signal data for a radio access network (RAN), control signal data for the RAN, and network key performance indicators (KPIs) associated with the RAN;
   receiving, by the device, energy consumption data identifying energy consumption by the RAN;
   processing, by the device, the network data and the energy consumption data, with one or more machine learning models, to identify actions that reduce energy consumption at a radio unit (RU), a distributed unit (DU), or a control unit (CU) of the RAN and that control and minimize control signal and reference signal utilization at the RAN; and
   causing, by the device, the actions to be implemented by the RU, the DU, the CU, or the RAN to save energy at the RAN, wherein the actions comprise causing the RAN to reduce traffic on a control channel of the RAN.

2. The method of claim 1, further comprising:
   processing the network data and the energy consumption data, with the one or more machine learning models, to identify additional actions that load balance a shared channel of the RAN, reduce mobility of a user equipment (UE), and reduce data on the control channel of the RAN; and
   causing the additional actions to be implemented by the RAN or the UE to save energy at the RAN or the UE.

3. The method of claim 2, wherein the additional actions prevent the UE from moving from the RAN to another RAN geographically located adjacent to the RAN.

4. The method of claim 1, further comprising:
   processing the network data and the energy consumption data, with the one or more machine learning models, to identify additional actions that reduce and shut down traffic channel power at the RAN while maintaining the control signal and reference signal utilization at the RAN; and
   causing the additional actions to be implemented by the RAN to save energy at the RAN.

5. The method of claim 1, further comprising:
   processing the network data and the energy consumption data, with the one or more machine learning models, to identify additional actions that utilize sleep modes, connected mode discontinuous reception (CDRX) cycle settings, physical downlink control channel (PDCCH) monitoring, synchronization signal block (SSB) periodicity settings, or selective switching on and off radio frequency (RF) channels at the RAN; and
   causing the additional actions to be implemented by the RAN to save energy at the RAN.

6. The method of claim 1, further comprising:
   processing the network data and the energy consumption data, with the one or more machine learning models, to identify additional actions that utilize scaling resources of the RAN, switching the RAN on and off, scaling resources of the CU or the DU of the RAN, and switching the CU or the DU on and off; and
   causing the additional actions to be implemented by the RAN to save energy at the RAN, the CU, or the DU.

7. The method of claim 1, wherein the energy consumption data is received from one or more energy meter counters associated with the RAN.

8. A device, comprising:
   one or more processors configured to:
      receive network data identifying reference signal data for a radio access network (RAN), control signal data for the RAN, and network key performance indicators (KPIs) associated with the RAN;
      receive energy consumption data identifying energy consumption by the RAN;
      process the network data and the energy consumption data, with one or more machine learning models, to identify actions that reduce energy consumption at a radio unit (RU), a distributed unit (DU), or a control unit (CU) of the RAN and that control and minimize control signal and reference signal utilization at the RAN;

cause the actions to be implemented by the RU, the DU, the CU, or the RAN to save energy at the RAN, wherein the actions comprise causing the RAN to reduce traffic on a control channel of the RAN;
process the network data and the energy consumption data, with the one or more machine learning models, to identify additional actions that load balance a shared channel of the RAN, reduce mobility of a user equipment (UE), and reduce data on the control channel of the RAN; and
cause the additional actions to be implemented by the RAN or the UE to save the energy at the RAN or the UE.

9. The device of claim 8, wherein the reference signal data includes data identifying levels of reference signals associated with the RAN, and the control signal data includes data identifying levels of control signals associated with the RAN.

10. The device of claim 8, wherein the network data further identifies a frequency domain resource allocation associated with the RAN.

11. The device of claim 8, wherein the actions maintain the network KPIs while controlling and minimizing the control signal and reference signal utilization at the RAN.

12. The device of claim 8, wherein the network KPIs provide a measure of one or more of:
user throughput at the RAN,
latency at the RAN, or
reliability of the RAN.

13. The device of claim 8, wherein the one or more processors are further configured to:
train the one or more machine learning models with historical traffic load data for the RAN, historical UE location distribution data for the RAN, historical UE mobility data for the RAN, and historical energy consumption by the RAN.

14. The device of claim 8, wherein the one or more processors are further configured to:
retrain the one or more machine learning models based on the actions.

15. A non-transitory computer-readable medium storing a set of instructions, the set of instructions comprising:
one or more instructions that, when executed by one or more processors of a device, cause the device to:
receive network data identifying reference signal data for a radio access network (RAN), control signal data for the RAN, and network key performance indicators (KPIs) associated with the RAN;
receive energy consumption data identifying energy consumption by the RAN,
wherein the energy consumption data is received from one or more energy meter counters associated with the RAN;
process the network data and the energy consumption data, with one or more machine learning models, to identify actions that reduce energy consumption at a radio unit (RU), a distributed unit (DU), or a control unit (CU) of the RAN and that control and minimize control signal and reference signal utilization at the RAN; and
cause the actions to be implemented by the RU, the DU, the CU, or the RAN to save energy at the RAN, wherein the actions comprise causing the RAN to reduce traffic on a control channel of the RAN.

16. The non-transitory computer-readable medium of claim 15, wherein the one or more instructions further cause the device to:
process the network data and the energy consumption data, with the one or more machine learning models, to identify additional actions that load balance a shared channel of the RAN, reduce mobility of a user equipment (UE), and reduce data on the control channel of the RAN; and
cause the additional actions to be implemented by the RAN or the UE to save energy at the RAN or the UE.

17. The non-transitory computer-readable medium of claim 15, wherein the one or more instructions further cause the device to:
process the network data and the energy consumption data, with the one or more machine learning models, to identify additional actions that reduce traffic channel power at the RAN while maintaining a control signal and a reference signal at the RAN; and
cause the additional actions to be implemented by the RAN to save energy at the RAN.

18. The non-transitory computer-readable medium of claim 15, wherein the one or more instructions further cause the device to:
process the network data and the energy consumption data, with the one or more machine learning models, to identify additional actions that utilize sleep modes, connected mode discontinuous reception (CDRX) cycle settings, physical downlink control channel (PDCCH) monitoring, synchronization signal block (SSB) periodicity settings, or selective switching on and off radio frequency (RF) channels at the RAN; and
cause the additional actions to be implemented by the RAN to save energy at the RAN.

19. The non-transitory computer-readable medium of claim 15, wherein the one or more instructions further cause the device to:
process the network data and the energy consumption data, with the one or more machine learning models, to identify additional actions that utilize scaling resources of the RAN, switching the RAN on and off, scaling resources of the CU or the DU of the RAN, and switching the CU or the DU on and off; and
cause the additional actions to be implemented by the RAN to save energy at the RAN, the CU, or the DU.

20. The non-transitory computer-readable medium of claim 15, wherein the one or more instructions further cause the device to:
train the one or more machine learning models with historical traffic load data for the RAN, historical user equipment (UE) location distribution data for the RAN, historical UE mobility data for the RAN, and historical energy consumption by the RAN; and
retrain the one or more machine learning models based on the actions.

* * * * *